United States Patent [19]

McGregor et al.

[11] Patent Number: 5,312,300
[45] Date of Patent: May 17, 1994

[54] PROTECTIVE COVER FOR UNIVERSAL JOINT SEAL BOOT

[75] Inventors: Michael McGregor, Saginaw; Marshall C. Davidson, Bay City; Donovan J. Zollinger, Saginaw, all of Mich.

[73] Assignee: General Motors Corporation, Detroit, Mich.

[21] Appl. No.: 939,750

[22] Filed: Sep. 2, 1992

[51] Int. Cl.$^5$ .............................. F16D 3/84; F16J 15/52
[52] U.S. Cl. .............................. 464/175; 277/212 FB
[58] Field of Search ............... 277/212 FB; 464/173, 464/175; 403/50, 51; 74/18, 18.1, 18.2

[56] References Cited

U.S. PATENT DOCUMENTS

| | | | |
|---|---|---|---|
| 1,748,702 | 2/1930 | Breer | 403/51 X |
| 1,982,445 | 11/1934 | Miquelon | 464/173 |
| 3,032,812 | 5/1962 | Van Riper | 403/51 X |
| 3,381,987 | 5/1968 | Husen | 277/212 FB |
| 3,842,621 | 10/1974 | Mazziotti . | |
| 5,145,191 | 9/1992 | Stewart et al. . | |

FOREIGN PATENT DOCUMENTS

| | | | |
|---|---|---|---|
| 1178984 | 12/1984 | Canada | 277/212 FB |
| 57-171124 | 10/1982 | Japan . | |
| 2238844 | 6/1991 | United Kingdom | 464/175 |

Primary Examiner—William A. Cuchlinski, Jr.
Assistant Examiner—Scott W. Cummings
Attorney, Agent, or Firm—Saul Schwartz

[57] ABSTRACT

A drive shaft assembly has universal joints at each end that include flexible seal boots. The drive shaft assembly has a protective cover for the flexible seal boots in the form of a seamless woven nylon sleeve that is clamped onto the universal joint housings at each end of the drive shaft. The sleeve is tied in the middle to reduce its profile. Alternatively, the drive shaft assembly may have an individual protective cover for each flexible seal boot. These individual protective covers are also in the form of a seamless woven nylon sleeve. But these individual sleeves have a conical portion that terminates in a small diameter opening that closely surrounds the drive shaft.

4 Claims, 2 Drawing Sheets

PROTECTIVE COVER FOR UNIVERSAL JOINT SEAL BOOT

TECHNICAL FIELD

This invention relates generally to automotive drive lines and more specifically to protective covers for the flexible seal boots of universal joints used in automotive drive lines.

BACKGROUND OF THE INVENTION

U.S. Pat. No. 3,842,621 granted to Philip J. Mazziotti Oct. 22, 1974 discloses a seal boot and a protective shield or cover for a universal joint that forms a driving connection between a drive shaft and a front road wheel of a motor vehicle. The seal boot encloses the working parts of the universal joint and it is flexible in order to accommodate joint angulation. The protective shield is a rigid, bell shaped member that is mounted on the shaft to protect the flexible seal boot from stone and gravel impingement and abrasive wear of foliage wiping over the flexible seal boot in "off road" service.

A drawback of the rigid Mazziotti shield is that it is necessarily spaced from the housing of the universal joint in order to accommodate joint angulation. Consequently portions of the flexible seal boot are still exposed to stone and gravel impingement and to abrasive wear of foliage wiping over the flexible seal boot when the vehicle is operated "off road" or in other harsh and abusive environments such as agricultural fields and the like.

SUMMARY OF THE INVENTION

The object of this invention is to provide an improved cover for protecting the flexible seal boot of a universal joint that is used in abusive environments.

A feature of the invention is that the improved cover envelopes the flexible seal boot completely so that the flexible sealing boot does not have any portion that is exposed to stone and gravel impingement or to the abrasive wear of foliage wiping over it when the vehicle is operated "off road" or in other abusive environments.

Another feature of the invention is that the improved cover includes a member of one piece construction that envelopes the flexible seal boot completely thereby eliminating any need for a second cooperative cover member.

Yet another feature of the invention is that the improved cover is in the form of a seamless woven sleeve that is assembled to a universal joint easily.

Still yet another feature of one embodiment of the invention is that an improved cover of one piece construction may be configured to protect flexible seal boots for universal joints at each end of a drive shaft assembly of the type that is commonly used in independently suspended, driven wheels of automobiles.

BRIEF DESCRIPTION OF THE DRAWINGS

The above and other objects, features and advantages of the invention will become more apparent from the following detailed description taken in conjunction with the accompanying drawings wherein like references refer to like parts and wherein.

Figure 1:
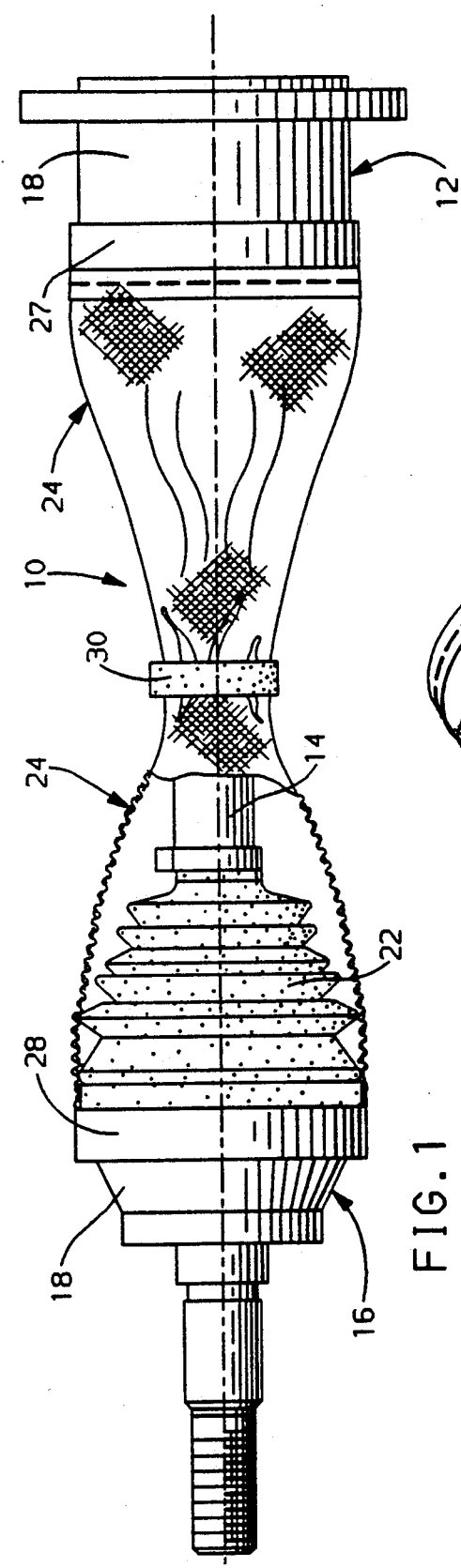
FIG. 1 is a partially sectioned front view of a drive shaft assembly for an independently suspended, driven wheel of an automobile having an improved protective cover in accordance with a first embodiment of the invention.
Figure 2:
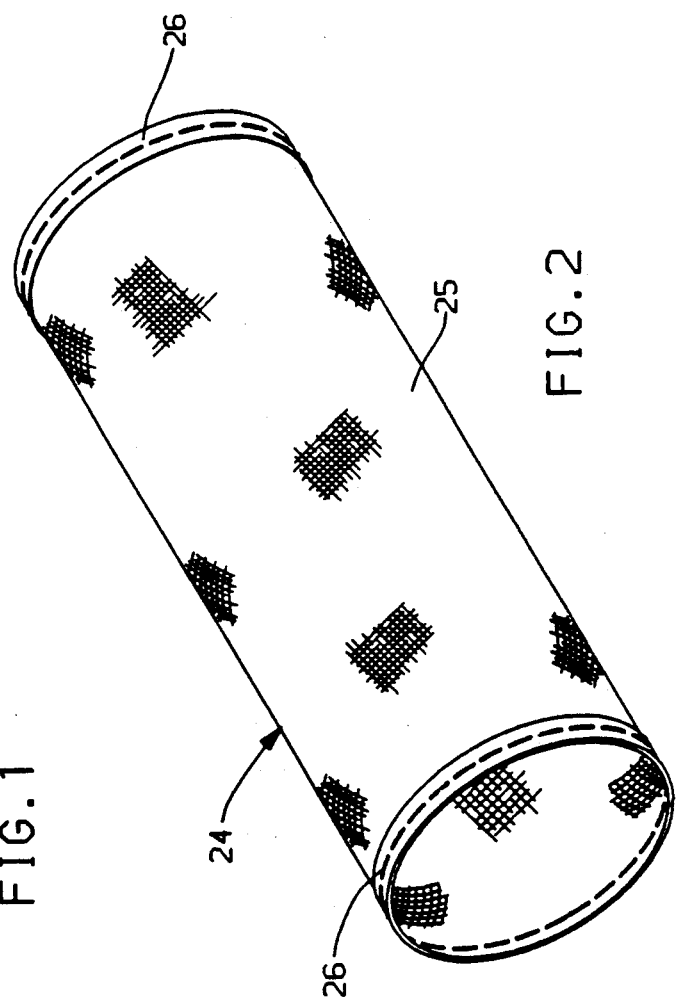
FIG. 2 is an isometric view of the improved protective cover that is shown in FIG. 1.

Referring now to the drawing and more particularly to FIGS. 1 and 2, a drive shaft assembly 10 for an independently suspended, driven vehicle wheel typically comprises an inboard universal joint 12 that is attached to one end of a drive shaft 14 for connection to a power source such as a transmission or differential output (not shown) and an outboard universal joint 16 that is attached to the other end of the drive shaft 14 for connecting the drive shaft assembly 10 to a vehicle wheel (not shown).

The inboard universal joint 12 is generally a constant velocity universal joint that telescopes or plunges to accommodate wheel jounce and bounce, such as a tripot or cross groove joint while the outboard universal joint 16 is generally a constant velocity universal joint that has a fixed center such as a Rzeppa joint. In any event each universal joint comprises an inner joint member (not shown) that is attached to the drive shaft 14, an outer joint member or housing 18 and drive elements disposed within the housing, such as balls or rollers (not shown) that transfer torque between the inner and outer joint members while allowing the inner and outer joint members to angulate with respect to each other.

The constant velocity universal joints 12 and 16 also typically include a flexible seal boot 22 that has a large diameter end that is clamped to a round open end of the universal joint housing 18 and a small diameter end that is clamped to the drive shaft 14. The flexible seal boots 22 are typically convoluted as shown in the drawing and these boots are typically made of natural or synthetic rubbers or synthetic thermoplastic elastomers, such as Hytrel which is a segmented polyester-polyether copolymer type of thermoplastic elastomer marketed by E. I. DuPont de Nemours Inc.

The drive shaft assembly 10 is located beneath the vehicle body where the flexible seal boots 22 are exposed to road hazards that are particularly severe when the vehicle is operated "off road". Consequently the drive shaft assembly 10 includes a protective cover 24 for protecting the flexible seal boots 22 against road hazards, particularly the abrasive wear of foliage wiping over the flexible boot seals 22, an "off road" hazard that is commonly encountered by farm vehicles.

The protective cover 24 is in the form of a seamless woven sleeve 25 that is woven of a durable material such as heavy duty bulk nylon. The woven sleeve 25 has a cuff at each end that is folded over and double stitched to the sleeve end to provide reinforced end bands 26. These reinforced end bands are used to attach the sleeve 25 to the respective housings 18 of the universal joints 12 and 16 at the opposite ends of the drive shaft assembly 10.

The end bands 26 are preferably about ¼ inch larger in diameter than the largest diameter of the flexible seal boots 22 in order to facilitate assembly of the seamless woven sleeve 25 which is slid in place over the outboard universal joint 16 after the flexible boots 22 are clamped onto the drive shaft 14 and the respective housings 18 of the two universal joints. The reinforced end bands 26 are then clamped over the clamped ends of the flexible seal boots 22 by sheet metal or plastic clamps 28. The middle of sleeve 25 is gathered and tied by a plastic tie wrap 30 in order to reduce the profile of the cover sleeve 24 and the space requirements for the drive shaft assembly 10.

Figure 3:
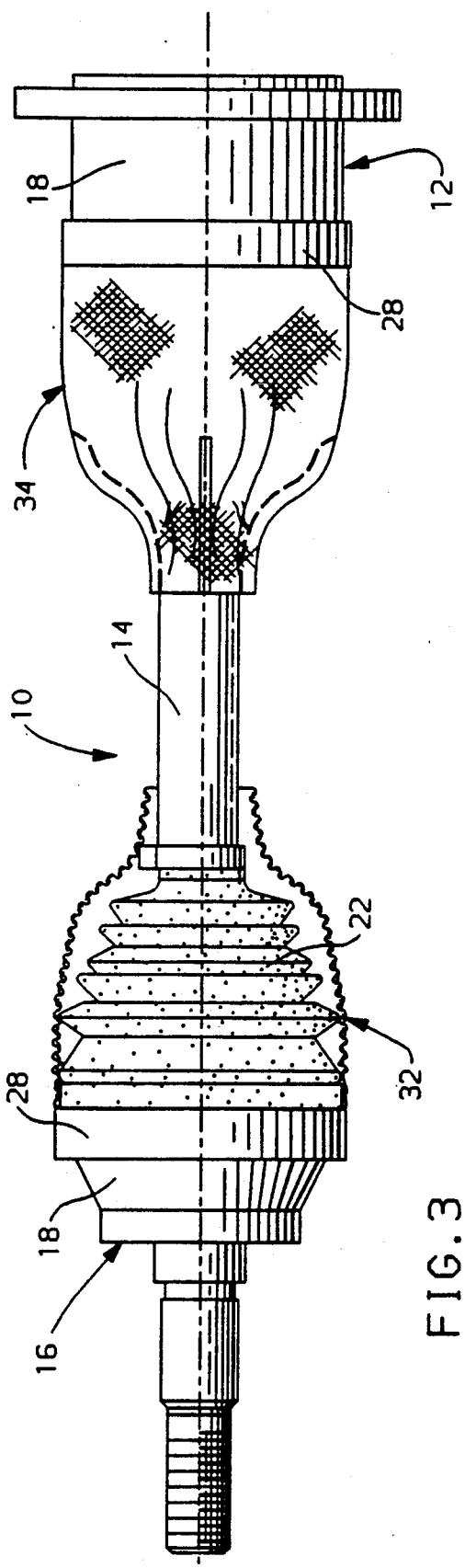
FIG. 3 is a partially sectioned front view of a drive shaft assembly for an independently suspended, driven wheel of an automobile having a protective cover in accordance with a second embodiment of the invention.
Figure 4:
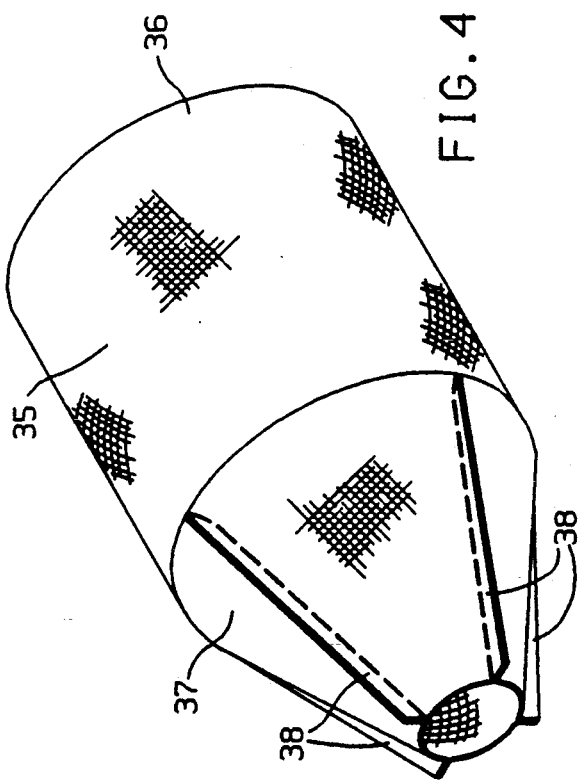
FIG. 4 is an isometric view of the improved protective cover that is shown in FIG. 3.

Referring now to FIGS. 3 and 4, a second embodiment of the invention is illustrated in conjunction with a drive shaft assembly that is identical to the drive shaft assembly 10 shown in FIGS. 1 and 2 except for the individual protective covers 32 and 34. Corresponding parts, except for the protective covers 32 and 34 are identified by the same numerals.

As before, the drive shaft assembly 10 comprises the inboard universal joint 12 that is attached to one end of the drive shaft 14 for connection to the power source such as a transmission or differential output (not shown) and the outboard universal joint 16 that is attached to the other end of the drive shaft 14 for connecting the drive shaft assembly 10 to the vehicle wheel (not shown).

As before the universal joints 12 and 16 also typically include the flexible sealing boots 22 that have their respective large diameter ends that are clamped to round open ends of the respective universal joint housings 18 and their respective small diameter ends that are clamped to the drive shaft 14. The flexible seal boots are typically convoluted as shown in the drawing and these boots are typically made of natural or synthetic rubbers or synthetic thermoplastic elastomers such as DuPont's Hytrel.

As indicated above, the flexible seal boots 22 are usually located beneath the vehicle body where they are exposed to road hazards particularly when the vehicle is operated "off road". Consequently this second embodiment of the drive shaft assembly 10 also includes a protective cover but in this case, two protective covers 32 and 34 for protecting each of the flexible seal boots 22 individually are provided.

The protective covers 32 and 34 are identical and each is in the form of a seamless woven sleeve that is woven of a heavy duty bulk nylon. Each sleeve 35 has a large diameter end 36 for attaching the sleeve 24 to the respective housings 18 of the universal joints 12 and 16 at the opposite ends of the drive shaft assembly 10. The large diameter end 36 is preferably about ¼ inch larger in diameter than the largest diameter of its associated flexible seal boot 22 in order to facilitate assembly of the protective sleeve 35.

The seamless woven sleeve 35 has a conical portion 37 that is formed by four double stitched seams 38 that are equally circumferentially spaced (i.e. 90 deg. apart) and that slant radially inwardly toward an opposite end of the protective sleeve 35 in the longitudinal direction to provide a small diameter opening 40 at the opposite end. The small diameter opening is also about ¼ inch larger in diameter than the drive shaft 14 so that the small diameter ends of the sleeves 35 are spaced closely to the drive shaft 14 when the protective covers 32 and 34 are installed on the drive shaft assembly 10 as shown in FIG. 3.

The protective covers 32 and 34 are assembled onto the drive shaft 14 before the flexible seal boots 22. The covers are slid in place over the flexible boots 22 after the boots are clamped onto the drive shaft 14 and the universal joint housings 18. The large diameter ends of the protective covers 32 and 34 are then clamped over the mounted ends of the flexible seal boots 22 by sheet metal or plastic clamps 28. The small diameter ends that are spaced closely around the drive shaft 14 do not need to be clamped down because the close spacing is sufficient to keep damaging material out and away from the flexible seal boots 22. Thus the protective covers 32 and 34 individually envelope the flexible seal boots 22 so that neither boot has any portion exposed when the respective universal joints 16 and 18 are angulated. Moreover, the protective covers 32 and 34 already have a low profile because of the slanted seams 38 and thus this second embodiment does not require any gathering and clamping for this purpose.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

What is claimed is:

1. In a drive shaft assembly (2) for an independently suspended, driven vehicle wheel having an inboard universal joint (12) that is attached to one end of a drive shaft (14) for connection to a power source and an outboard universal joint that is attached to the other end of the drive shaft (14) for connecting the drive shaft assembly (10) to a vehicle wheel, each universal joint having an inner joint member that is attached to the drive shaft (14), an outer joint member (18) and drive elements disposed within the outer joint member that transfer torque between the inner and outer joint members while allowing the inner and outer joint members to angulate with respect to each other, each universal joint further having a flexible seal boot (22) that has a large diameter end that is clamped to a round open end of the outer joint member (18) and a small diameter end that is clamped to the drive shaft, the improvement comprising;

a protective cover (24) for protecting the flexible seal boots (22) that is in the form of a seamless woven cylindrical sleeve that has an cuff at each end that is folded over and double stitched to the sleeve end to provide reinforced end bands (26) that attach the sleeve to the respective outer joint members (18) of the universal joints (12, 16) at the opposite ends of the drive shaft assembly (10) so that the protective cover envelopes the flexible seal boots of both universal joints.

2. The improvement as defined in claim 1 wherein the end bands (26) are about ¼ inch larger in diameter than the largest diameter of the flexible sealing boots (22) in order to facilitate installation of the protective cover (24).

3. The improvement as defined in claim 2 wherein the protective cover (24) is slid in place over one of the universal joints (12, 16) after the flexible seal boots (22) are clamped onto the drive shaft (14) and the outer joint members (18) and the reinforced end bands (26) are clamped over the clamped ends of the flexible seal boots (22) by clamps (28).

4. The improvement as defined in claim 3 wherein the middle of the protective cover sleeve (24) is gathered and tied by a tie wrap (30) to reduce the profile of the protective cover.

* * * * *